Aug. 24, 1948.　　　　　F. RIEBER　　　　　2,447,818
PERIODIC REVERSING DRIVE
Filed Jan. 11, 1945　　　　　　　　　　3 Sheets-Sheet 1

INVENTOR.
FRANK RIEBER
BY

Aug. 24, 1948.   F. RIEBER   2,447,818
PERIODIC REVERSING DRIVE

Filed Jan. 11, 1945   3 Sheets-Sheet 2

INVENTOR.
FRANK RIEBER
BY

Aug. 24, 1948.  F. RIEBER  2,447,818
PERIODIC REVERSING DRIVE
Filed Jan. 11, 1945  3 Sheets-Sheet 3
Fig. 10.
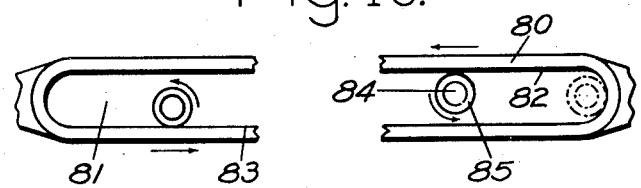
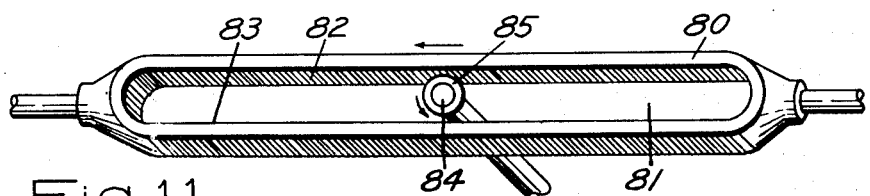
Fig. 11.
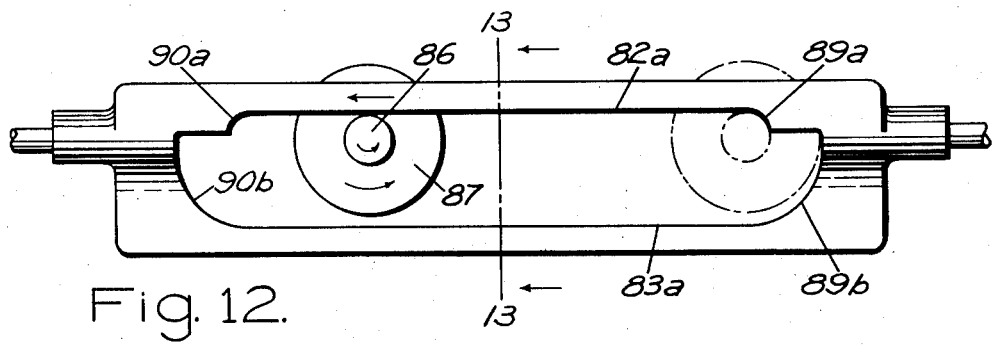
Fig. 12.
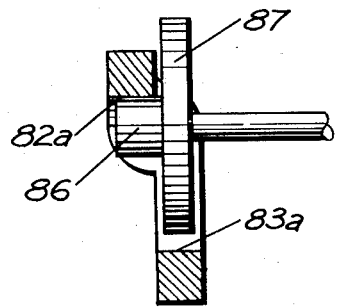
Fig. 13.
INVENTOR.
FRANK RIEBER
BY Patented Aug. 24, 1948

2,447,818

UNITED STATES PATENT OFFICE 2,447,818

PERIODIC REVERSING DRIVE

Frank Rieber, New York, N. Y., assignor to Interval Instruments, Inc., a corporation of New York Application January 11, 1945, Serial No. 572,368

15 Claims. (Cl. 74—71)

My invention relates to a mechanism for converting a continuous driving force into a force which reverses itself in direction at periodic intervals.

It is an object of the invention to provide a device of the character described which shall be smooth and silent in operation, and which can be run successfully over long periods of time without attention or servicing.

It is a further object to provide a mechanism by which a uniform driving motion may be converted into a reciprocating driven motion, in which the speed of the driven motion at various portions of its cycle may be varied according to the chosen constants of the machine, thus the machine lends itself to the production of a motion of uniform velocity throughout its entire stroke in either direction and in which the speed during the forward stroke may be either identical with or different from the speed during the return stroke, or in which either the forward or the reverse stroke may be made to vary in speed according to some predetermined function of the movement.

A further object of my invention is to produce a device of the class described which shall be simple, low in cost, and yet precise in operation.

A further object of my invention is to eliminate from the operation of the device, so far as may be possible, minor periodic vibrations due to irregular action of gear teeth etc., which, added to the smooth action of the original driving shaft, produce irregular action in the driven member.

Further objects of my invention will appear from the following disclosure. Reciprocating motion is commonly derived from continuous motion, such as that of a shaft driven at uniform speed, by mechanisms such as a crank on the rotating member, driving a connecting rod which, in turn, drives the reciprocating member. The motion of the reciprocating member, if a long connecting rod be used, approximates a sine function of the rotation of the driving shaft.

Another common expedient is to cause a crank on the driving shaft to engage a slot in the driven reciprocating member. This latter arrangement produces true harmonic motion in the driven reciprocating system.

Another system commonly used consists of a pinion on the driving shaft, and a slotted driven member, the interior of the slot being provided with gear teeth in the form of two racks, extending along the slides of the slot, so spaced that only one of these racks can engage the pinion. Teeth at the end of the slot cause either the pinion or the slotted member to be transposed until the pinion is transferred from engagement with one rack to engagement with the other, thereby reversing the mechanism.

For many purposes, none of the above mechanisms are completely suitable. Where uniform driven velocity in either direction is desired, neither the connecting rod nor the crank and slot mechanism are suitable. The pinion and rack mechanism, while it produces constant velocity, is relatively difficult to manufacture as a precise mechanism, and in less than a precise form, introduces vibrations and irregularities into the driven motion, which, in many cases are undesirable.

In the mechanism of my invention, the driving member is generally cylindrical in form rotating about the axis of the cylinder, or in the form of a crowned wheel, although I may employ two such members of different diameters, but concentric with each other. The driven member has two drive surfaces between which the driving member is embraced, the dimensions being such that the driving member will engage only one of said driven surfaces at a time, but may be brought into contact with either. The shapes of these driven surfaces and of the driving member are designed to give substantially a point contact between them.

This drive member is arranged to drive the driven surface with which it is at the moment in contact by reason of the adhesion between them, and to this end I construct both the drive member and the driven surfaces of magnetically permeable material, and I provide means for magnetizing them with opposite polarity, to cause them to adhere.

By reason of the construction above referred to, the two driven surfaces are on diametrically opposite sides of the drive member, thus the direction of motion of the driven member will be reversed as the drive member is transferred from one driven surface to the other. Thus reversal is accomplished by causing the driven surfaces to cling first to one end and then to the other of a line drawn through a diameter of the drive cylinder, normal to the axis and to the line of contact between the drive member and the driven surfaces. This normal line may be considered as fixed with reference to the framework.

Transference of the point of contact from one end of this diameter to the other is caused periodically by the engagement, with the rotating member, of a magnetically permeable cross-over member, to which the driving rotor adheres magnetically during the cross-over period, adhesion between the driving cylinder and the cross-over member providing the force necessary to translate the driven member from engagement with one end of the normal driving diameter to the other end of the said driving diameter.

The invention accordingly comprises an article of manufacture possessing the features, properties and the relation of elements which will be exemplified in the article hereinafter described and the scope of the application of which will be indicated in the claim.

For a fuller understanding of the nature and objects of the invention, reference should be had to the following detailed description taken in connection with the accompanying drawing, in which:

Fig. 10 is a fragmentary front elevation of the invention as applied to the conversion of the uniform rotary motion into reciprocating straight line motion, with the same uniform velocity in each direction.

Fig. 11 is a perspective view of the construction of Fig. 10.

Fig. 12 is a fragmentary front elevation of the invention as applied to the conversion of uniform rotary motion into reciprocatory straight line motion where the velocity in one direction is greater than that in the reverse direction.

Fig. 13 is a section on the line 13—13 of Fig. 12.

Figure 1:
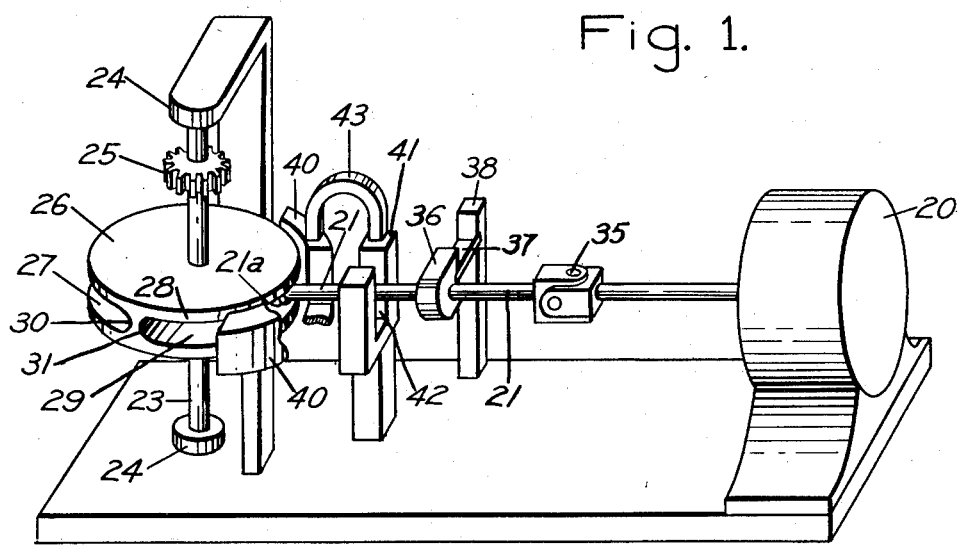
Fig. 1 is a perspective view showing a device embodying this invention for converting continuous rotary motion into an oscillating motion in which the same uniform velocity of motion is produced throughout both the forward and reverse strokes of the device.

Referring now to Fig. 1, the numeral 20 designates a source of continuous power such as an electric motor, driving a shaft 21 which either constitutes or carries the driving member. The numeral 23 designates a shaft mounted in bearings 24 transverse to and in a common plane with, the shaft 21. This shaft has a pinion 25 from which the oscillatory power may be taken. Mounted upon the shaft 23 is a cylindrical block 26, constituting the driven member, having a circumferential groove 27 cut in its outer surface providing an upper wall 28 and a lower wall 29, which are the upper and lower driven surfaces and which are in position to embrace the end of the driving member 21 between them. These surfaces are spaced from each other slightly more than the diameter of the driving member. The driving element has fixed upon its end, a wheel 21a which engages the driven surfaces with a point contact.

In the embodiment shown in Fig. 1, the groove 27 is less than the circumference of the block and at each end terminates in a semicylindrical face 30 or 31 which is tangent to and serves to connect the driven surfaces 28 and 29.

The drive member and the driven member are so mounted as to permit a sufficient relative motion to transfer the drive member from one driven surface to the other. This is accomplished, as shown, by connecting the motor 20 with the drive member 21 by a universal joint 35, to permit a limited vertical motion of the drive member. At the same time, to prevent transverse horizontal movement, the drive member itself is journalled in a block 36 which is supported by a leaf spring 37 from a post 38. Thus the spring can flex to give the necessary vertical movement but prevents horizontal movement.

Means are provided to magnetize the drive member and the driven member 26 with opposite polarity. To this end, a block 40 is mounted closely adjacent to the driven member to magnetize it to the maximum without unduly opposing its motion, and a corresponding member 41 is placed in intimate relation to the drive member 21, which may conveniently take the form of a block having a vertical slot 42 of a width slightly greater than the diameter of the drive member, supported in such a manner as to embrace the drive member without touching it. A strong magnet 43 preferably made of one of the alloys of high magnetic retentivity, is arranged to magnetize the members 41 and 40 with opposite polarity, and thereby correspondingly to magnetize the drive member 21 and the driven surfaces 28 and 29, to cause them to adhere together.

The operation of this device will be clear from the description. As the drive member 21 is rotated by the motor, the wheel 21a drives whichever one of the drive surfaces, 28 or 29, with which it contacts because of the magnetic adhesion between them. As soon, however, as the wheel reaches the end of the slot 27 and meets the face 30 or 31, it rides over that surface, to which also it adheres, being thereby transferred to the other driven surface. As soon as the drive member encounters the other drive surface, oscillatory motion is resumed but in the reverse direction. This reverse motion continues until the other face, 31 or 30 is encountered, to transfer the drive member back again to the first drive surface.

It will be observed that with this construction, the velocity of the driven motion is constant for the entire period of time during which the drive member is in contact with either driven surface, and it is the same in both directions. The stopping and starting in the reverse direction all takes place during the very small interval while the drive member is in contact with the surfaces 30 or 31.

Figure 2:
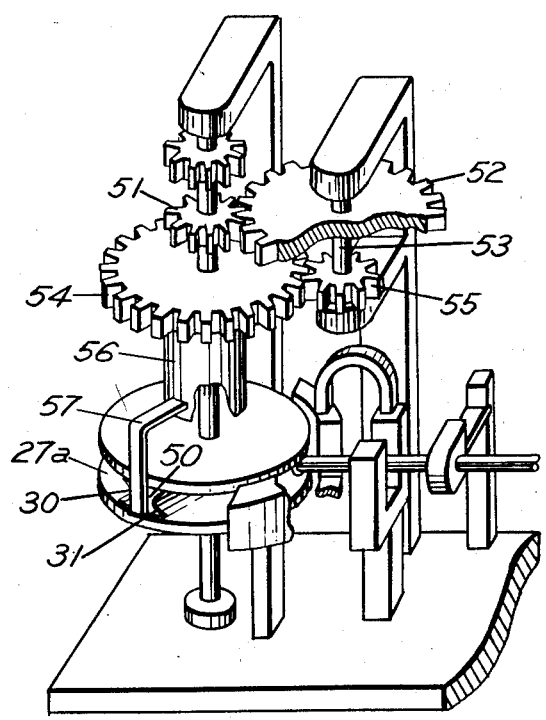
Fig. 2 is a similar view of a device having means to permit the oscillating member to move more than a complete revolution before reversing.

The form of the invention shown in Fig. 2 is in the main similar to that of Fig. 1, and parts which are identical are identified by the same numerals in the two figures, without requiring redescription.

In this embodiment the slot 27a, in the driven member 26, extends completely around the periphery. The end surfaces 30 and 31 are carried by separate block 50 which is rotatable about the axis of shaft 23 independent of the driven member.

In order to rotate the block 50 in the same direction as the driven member 20, but at a slower speed, there is provided upon the shaft 23 a pinion 51 which drives a gear 52 on a stub shaft 53 which in turn drives a gear 54 through the medium of a pinion 55 on stubshaft 53. The gear 54 is mounted on a sleeve 56 journalled on shaft 23, and carries an arm 57 which in turn drives the block 50. Thus the gear train just described is a reduction train to drive the block 50 as above described. This construction is designed to permit the driven member to move in each direction more than one revolution before reversing.

The constructions shown in Figs. 3, 4, 5, and 6 differ from the construction of Fig. 1 in that the line of contact drive between the drive member and the driven surface is defined by raising upon the driven surface a track 60 or 61 thus defining the path of the point of contact by the contour of the driven surface, rather than by the contour of the driving surface as in the first embodiments. Thus no driving element such as 21a is used. With this construction as shown in Figs. 3, 4, 5, and 6, it is possible to obtain variations in the speed of the driven member.

Figure 3:
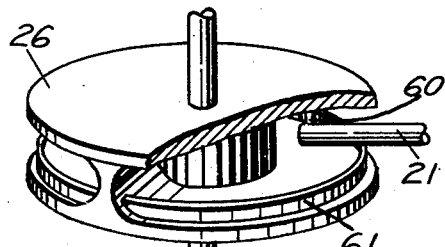
Fig. 3 is a perspective fragmentary view of a driving and a driven member constructed to give a uniform forward velocity which differs from the uniform reverse velocity.
Figure 4:
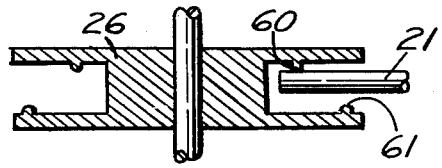
Fig. 4 is a section through the construction of Fig. 3 in the plane of the axis of the drive and driven members.

In Figs. 3 and 4, one of the tracks 60 is closer to the axis of the shaft 23 than the other one 61, and thus, since the speed of the drive member is constant, the angular speed of the driven member is correspondingly increased. It is thus possible to get a slow forward motion and a quick return, both motions being individually at a constant speed.

Figure 5:
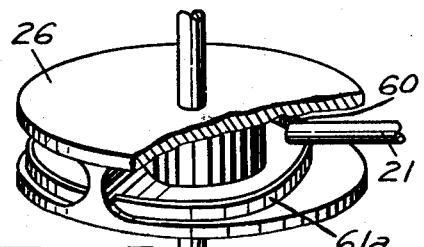
Figs. 5 and 6 are views similar to Figs. 3 and 4 showing a device constructed to give a uniform velocity in one direction, and a velocity varying according to a predetermined function of the motion during the reverse movement.
Figure 6:
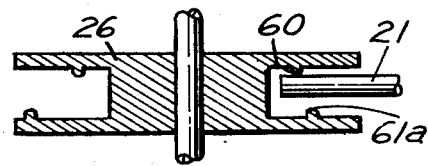

In Figs. 5 and 6, the track 61a is not concentric with shaft 23, so that at each instant, that is at each angular position, the rate of travel of the driven member is inversely proportional to the distance of the point of contact between the drive member and the track, from the axis of shaft 23. The track 61a may be designed to give a wide variety of speed changes as may be desired.

It will be understood that in these and subsequent embodiments, the magnetizing elements 40, 41, and 43 will be employed as in Figs. 1 and 2. These elements are omitted from these figures for simplicity.

Figure 8:
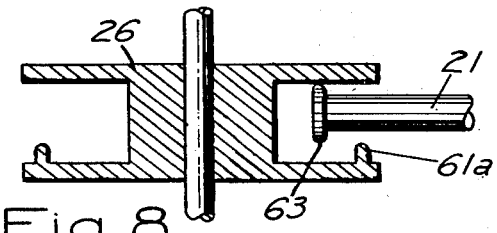
Fig. 8 is a section through the drive and driven members of the construction of Fig. 7 in the plane of the axis of both members.
Figure 9:
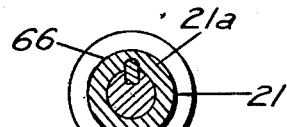
Fig. 9 is a detail.
Figure 7:
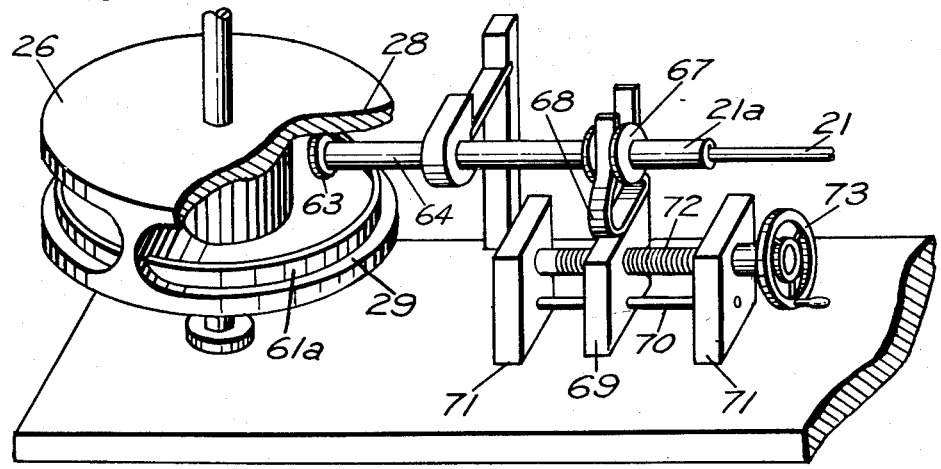
Fig. 7 is a perspective view of an embodiment of the invention constructed to permit changing the velocity in one direction of the driven member.

The construction shown in Figs. 7 and 8 and 9 combines both of the principles illustrated, and provides means for changing the speed of the driven member in one direction at will. In this embodiment the drive member has a drive element or wheel 63 itself adapted to define the line of contact with the driven member as in the first embodiment, but this element contacts only with one driven surface 28, and external means are provided to move this element along its axis toward or from the axis of shaft 23, to vary the speed of motion of the driven element while these two are in contact.

The drive member 21 engages the other driven surface 29 in such a manner as to permit this longitudinal movement of the drive member without altering the speed of the driven member during the reverse motion. To this end the driven surface 29 is shown provided with a track 61a constructed to engage the surface of a cylindrical portion of the drive member 21.

It will of course be understood that the dimensions of the parts are such that during the forward motion, the drive element 63 rides upon the surface 28, while during the reverse movement the cylindrical surface 64 of the drive member rides upon the track 61a thereby holding the drive element 63 from contact with surface 29. Thus the forward movement is determined by the position of the element 63 relative to the axis of shaft 23, while the reverse movement is determined by the form of the track 61a.

In order to move the drive member 21 longitudinally, as shown herein, the drive member 21 is itself splined to a drive shaft 21a by a spline 66 and has attached thereto a grooved collar 67 which embraces the arms of a bifurcated arm 68. This arm 68 is carried by a block 69 slidable upon a rod 70 between two stationary blocks 71. A screw 72 journalled in blocks 71 operated by a hand wheel 73 screws into the block 69, and gives adjustment to the position of the block and hence to the position of the driving wheel 63 and to the speed of the driven device.

In the form of the invention shown in Figs. 10, 11, 12, and 13 the invention is applied to the conversion of continuous rotary motion to a straight line reciprocatory motion.

In the form of Figs. 10 and 11, the driven member comprises a link shape member 80 having a longitudinal slot 81 the upper and lower faces 82 and 83 of which serves as the driven surfaces, between which is embraced the drive member 84. The drive member may have a drive element or wheel 85 which engages the driven surfaces as in the other embodiments. The ends of the slots are cylindrical to serve to transfer the drive member from one driven surface 82 or 83 to the other, as has already been described. This provides equal uniform motion in both directions.

In the form of the invention shown in Figs. 12 and 13, the upper driven surface 82a and the lower driven surface 83a are offset from each other as shown in Fig. 13, and two separate drive elements 86 and 87 are provided on the drive member, offset from each other by the same distance, so that each of these drive elements may engage with its own driven surface without interference with the other. In this embodiment, I prefer to make the transfer surfaces 89 and 90 of two separate cylindrical portions 89a and 89b, and 90a and 90b—those bearing the subscript (a) being of a diameter substantially equal to the smaller of the drive elements, and those bearing the subscript (b) being of substantially the diameter of the larger of the two drive elements.

By this construction, it will be seen that the travel of the member in one direction will be at the peripheral speed of the larger drive element whereas the travel in the other direction will be at the peripheral speed of the smaller drive element.

With any of the foregoing constructions, it will be clear that the speed of the driven member in any one direction will be constant unless the track is deliberately designed to give a speed which is not constant, but in any event it will follow a fixed law and it will also be clear that the forward speed and the reverse speed may be made equal to each other or may bear any desired relation to each other.

It will also be clear that by reason of the fact that the driving force is the adhesion between the drive and driven elements without the employment of gear teeth, that the drive will be smooth and without irregularities.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. A device for converting between rotary and oscillatory power comprising, a shaft adapted to rotate continuously in the same direction a friction wheel of magnetic material, an oscillating member having a pair of friction surfaces on diametrically opposite sides of said friction wheel and composed of magnetic material, means for magnetizing said wheel and said surfaces with opposite magnetic polarity, and magnetic means for transferring said friction wheel from one of said surfaces to the other after a predetermined amount of movement.

2. A device for converting between rotary and oscillatory power comprising a shaft adapted to rotate continuously in the same direction a friction wheel of magnetic material, an oscillating member having a pair of friction surfaces on diametrically opposite sides of said friction wheel and composed of magnetic material, means for magnetizing said wheel and said surfaces with opposite magnetic polarity, and magnetic means for transferring said friction wheel from one of said surfaces to the other after a predetermined amount of movement, comprising an arcuate surface of magnetic material connecting said friction surfaces positioned to engage said friction wheel at the end of its predetermined travel.

3. A device for converting between rotary and oscillatory power comprising a shaft adapted to rotate continuously in the same direction a friction wheel of magnetic material, an oscillating member having a pair of friction surfaces on diametrically opposite sides of said friction wheel and composed of magnetic material, means for magnetizing said wheel and said surfaces with opposite magnetic polarity, and magnetic means for transferring said friction wheel from one of said surfaces to the other after a predetermined amount of movement, comprising an arcuate surface of magnetic material means for driving said arcuate surface in the same direction as said oscillating member and at a different speed.

4. A device for converting between rotary and oscillatory power comprising a shaft adapted to rotate continuously in the same direction a friction wheel of magnetic material, an oscillating member having a pair of friction surfaces on diametrically opposite sides of said friction wheel and composed of magnetic material, means for magnetizing said wheel and said surfaces with opposite magnetic polarity, and magnetic means for transferring said friction wheel from one of said surfaces to the other after a predetermined amount of movement, comprising an oscillating member between said friction surfaces and speed changing mechanism for driving said second oscillating member from said first oscillating member.

5. A device for converting between rotary and oscillatory power comprising a shaft adapted to rotate continuously in the same direction a friction wheel of magnetic material, an oscillating member having a pair of friction surfaces on diametrically opposite sides of said friction wheel and composed of magnetic material, means for magnetizing said wheel and said surfaces with opposite magnetic polarity, and magnetic means for transferring said friction wheel from one of said surfaces to the other after a predetermined amount of movement, one of said friction surfaces being constructed and arranged to engage said friction wheel nearer to the axis of said wheel than to the other.

6. A device for converting between rotary and oscillating power comprising a shaft adapted to rotate continuously in the same direction, a rotary oscillatory member having a pair of spaced friction surfaces of magnetic material, positioned to embrace said shaft between them, said shaft being of magnetic material, means for magnetizing said shaft and said surfaces with opposite polarity, and magnetic means between said surfaces and rotatable in the same direction therewith for transferring said shaft from contact with one of said surfaces to contact with the other surface.

7. A device for converting between rotary and oscillating power comprising a shaft adapted to rotate continuously in the same direction, a rotary oscillatory member having a pair of spaced friction surfaces of magnetic material, positioned to embrace said shaft between them, said shaft being of magnetic material, means for magnetizing said shaft and said surfaces with opposite polarity, and magnetic means between said surfaces and rotatable in the same direction therewith for transferring said shaft from contact with one of said surfaces to contact with the other surface, said magnetic means being separately oscillatable, and means for driving said magnetic means in the same direction as said oscillatory member, but at a different speed.

8. A device for converting between rotary and oscillating power comprising a shaft adapted to rotate continuously in the same direction, a rotary oscillatory member having a pair of spaced friction surfaces of magnetic material, positioned to embrace said shaft between them, said shaft being of magnetic material, means for magnetizing said shaft and said surfaces with opposite polarity, and magnetic means between said surfaces and rotatable in the same direction therewith for transferring said shaft from contact with one of said surfaces to contact with the other surface, said magnetic means being separately oscillatable, and a speed changing mechanism for driving said magnetic means in the same direction as said oscillatory member but at a different speed.

9. A device for converting between rotary and oscillating power comprising a shaft adapted to rotate continuously in the same direction, a rotary oscillatory member having a pair of spaced friction surfaces of magnetic material, positioned to embrace said shaft between them, said shaft being of magnetic material, means for magnetizing said shaft and said surfaces with opposite polarity, said friction surfaces having different paths of contact with said shaft, at different distances from the center of said oscillatory member, and magnetic means between said surfaces and rotatable in the same direction therewith for transferring said shaft from contact with one of said surfaces to contact with the other surface.

10. A device for converting between rotary and oscillating power comprising a shaft adapted to rotate continuously in the same direction, a rotary oscillatory member having a pair of spaced friction surfaces of magnetic material, positioned to embrace said shaft between them, said shaft being of magnetic material, means for magnetizing said shaft and said surfaces with opposite polarity, said friction surfaces being in the form of projecting rails positioned to engage said shaft, at least one of said rails varying in its distance from the center of said oscillatory member, to vary the speed of the oscillatory motion during the movement in one direction, and magnetic means between said surfaces and rotatable in the same direction therewith for transferring said shaft from contact with one of said surfaces to contact with the other surface.

11. A device for converting between rotary and oscillatory power comprising, a shaft adapted to rotate continuously in the same direction, a plurality of friction peripheries on said shaft at different longitudinal positions thereon, an oscillatable member having a pair of friction surfaces one adapted to engage each of said friction peripheries, at diametrically opposite points, said shaft and said friction surfaces being of magnetic material, means for magnetizing the peripheries and the surfaces with opposite polarity, magnetic means between said surfaces and rotatable therewith for relatively moving said shaft and said oscillatable member to transfer the point of contact an engagement between one of said friction peripheries and one of said friction surfaces to an engagement between the other of said friction peripheries and the other of said friction surfaces.

12. A device for converting between rotary and rotating oscillatory power, comprising, a shaft adapted to rotate continuously in the same direction, a rotary oscillatory member having a pair of friction surfaces thereon, a plurality of friction peripheries on said shaft in position to engage said friction surfaces respectively, said friction surfaces being at different radial distances from the center of said oscillating member, means for magnetizing said friction surfaces and said friction peripheries respectfully with opposite polarity, and magnetic means for relatively moving the friction surfaces and said shaft, to transfer the point of contact from an engagement between one of said friction surfaces and one of said peripheries, to an engagement between the other of said peripheries and the other of said friction surfaces.

13. A device for converting between rotary and rotating oscillatory power, comprising, a shaft adapted to rotate continuously in the same direction, a rotary oscillatory member having a pair of friction surfaces thereon, a plurality of friction peripheries on said shaft in position to engage said friction surfaces respectively, said friction surfaces being at different radial distances from the center of said oscillating member, means for magnetizing said friction surfaces and said friction peripheries respectfully with opposite polarity, and magnetic means for relatively moving the friction surfaces and said shaft, to transfer the point of contact from an engagement between one of said friction surfaces and one of said peripheries, to an engagement between the other of said peripheries and the other of said friction surfaces, and means for varying the radial distance between one of said friction surfaces and the center of said oscillating member.

14. A device for converting between rotary and rotating oscillatory power, comprising, a shaft adapted to rotate continuously in the same direction, a rotary oscillatory member having a pair of friction surfaces thereon, a plurality of friction peripheries on said shaft in position to engage said friction surfaces respectively, said friction surfaces being at different radial distances from the center of said oscillating member, means for magnetizing said friction surfaces and said friction peripheries respectfully with opposite polarity, and magnetic means for relatively moving the friction surfaces and said shaft, to transfer the point of contact from an engagement between one of said friction surfaces and one of said peripheries, to an engagement between the other of said peripheries and the other of said friction surfaces, one of said friction surfaces being annular and one of the corresponding friction periphery being constructed to provide a linear contact, and the other of said friction surfaces being a peripheral line, and the corresponding friction periphery being cylindrical, and means for moving the said shaft toward and from the center of the oscillating member, whereby the rate of motion of said oscillating member in one direction may be varied.

15. A device for converting between rotary and rotating oscillatory motion comprising a shaft adapted to rotate continuously in one direction, a second shaft coupled to said shaft by a universal coupling, a support, a spring connecting said second shaft to said support constructed and arranged to hold said shaft rigidly in one direction transverse to the direction of the shaft, and to permit a limited motion in the other direction transverse to the shaft, a friction drive member on the end of said second shaft, an oscillating member having a pair of friction members between which said drive member is embraced, so that it may engage with either, means for magnetizing the said drive member and the friction surfaces whereby the drive member may drive the surface which it engages, and means for moving said second shaft about said universal joint at the close of the movement in either direction to bring it into engagement with the other of said friction surfaces.

FRANK RIEBER.

REFERENCES CITED

The following references are of record in the file of this patent:

UNITED STATES PATENTS

| Number | Name | Date |
| --- | --- | --- |
| 1,074,579 | Thompson | Sept. 30, 1913 |
| 1,243,169 | Herman | Oct. 16, 1917 |
| 1,246,426 | Herman | Nov. 13, 1917 |
| 2,178,641 | Naumann | Nov. 7, 1939 |